(12) United States Patent
Tardif

(10) Patent No.: US 6,935,536 B2
(45) Date of Patent: Aug. 30, 2005

(54) CAP FOR A CONTAINER

(75) Inventor: Pierre Tardif, Longueuil (CA)

(73) Assignee: Trudeau Corporation 1889 Inc., Boucherville (CA)

(*) Notice: Subject to any disclaimer, the term of this patent is extended or adjusted under 35 U.S.C. 154(b) by 84 days.

(21) Appl. No.: 10/314,908

(22) Filed: Dec. 9, 2002

(65) Prior Publication Data

US 2004/0108336 A1 Jun. 10, 2004

(51) Int. Cl.⁷ .................................................. B67D 3/00
(52) U.S. Cl. ................. 222/153.14; 222/472; 222/509; 222/518; 251/104
(58) Field of Search ................ 222/153.14, 470, 222/472, 507, 509, 518; 251/101, 102, 104, 110

(56) References Cited

U.S. PATENT DOCUMENTS

| | | | |
|---|---|---|---|
| RE15,225 E | * | 11/1921 | Jarvis ........................ 251/110 |
| 2,123,907 A | | 7/1938 | Masbach et al. |
| 2,165,825 A | | 7/1939 | Von Bültzingslöwen |
| 2,714,476 A | | 8/1955 | Locke |
| 3,095,128 A | | 6/1963 | Wonso |
| 3,373,907 A | | 3/1968 | Batrow |
| 4,049,152 A | | 9/1977 | Treanor |
| 4,174,053 A | | 11/1979 | Shimizu |
| 4,623,076 A | | 11/1986 | Karpal |
| 4,979,655 A | | 12/1990 | Gallucci |
| 4,997,108 A | | 3/1991 | Hata |
| 5,005,723 A | | 4/1991 | Smallfoot |
| 5,037,015 A | | 8/1991 | Collins |
| 5,038,959 A | | 8/1991 | Patel |
| 5,139,182 A | | 8/1992 | Appla |
| 5,169,602 A | | 12/1992 | Pang et al. |
| 5,246,145 A | | 9/1993 | Leoncavallo et al. |
| 5,497,892 A | | 3/1996 | Takatsuki et al. |
| 5,615,808 A | * | 4/1997 | Huang ........................ 222/472 |
| 5,713,493 A | | 2/1998 | Garibaldi |
| 5,862,948 A | | 1/1999 | Duchon et al. |
| 5,944,235 A | | 8/1999 | Won |
| 5,947,343 A | * | 9/1999 | Horstmann ................. 222/474 |
| 5,988,457 A | | 11/1999 | Andrew et al. |
| 6,041,982 A | | 3/2000 | Cautereels et al. |
| 6,172,341 B1 | | 1/2001 | Hoffmann et al. |
| 6,443,336 B2 | | 9/2002 | Antonetti et al. |
| 6,752,331 B2 | * | 6/2004 | Wu ............................. 239/373 |

FOREIGN PATENT DOCUMENTS

| | | |
|---|---|---|
| DE | 2152725 | 4/1973 |
| EP | 0 169 366 | 1/1986 |

* cited by examiner

*Primary Examiner*—Kenneth Bomberg
(74) *Attorney, Agent, or Firm*—Schweitzer Cornman Gross & Bondell LLP

(57) ABSTRACT

Cap for a container, including a body having an inlet, a spout and a passageway therebetween. The cap also includes a valve movable between a first position wherein the passageway is blocked and a second position wherein the passageway is at least partly unblocked, the valve being biased towards the first position. Furthermore, the cap includes an actuator mounted to the body and engaging the valve. Selective control of the state of the valve is associated with movement of the actuator in a different direction than for securing the valve in the open position. The combination of movements required to lock the valve in the open position is sufficiently complex to reduce its probability of opening unintentionally. Meanwhile, the combination of movements is simple enough to be performed by a single finger.

37 Claims, 7 Drawing Sheets

CAP FOR A CONTAINER

FIELD OF THE INVENTION

The present invention relates generally to a cap for a container and, in particular, to a cap for a container adapted to carry a liquid suitable for human consumption.

BACKGROUND OF THE INVENTION

Portable beverage containers of the carafe type typically consist of a cylindrical vessel to which is affixed a cap, such as a screw cap. The cap is removable so that it, as well as the interior of the beverage container, can be washed. The cap includes an opening through which the liquid is poured from the beverage container into a glass or mug. A mechanism is usually provided for selectively blocking or liberating the opening so that the liquid from the inside of the body may pass therethrough.

Certain mechanisms for allowing the beverage to be released through the opening of a container include spring-loaded valves which are actuated by the user of the carafe in order to expose the opening. Such mechanisms frequently rely on depression of a region of the container in order to regulate the state of the valve. Clearly, such arrangements are inconvenient, as the user is required to continuously maintain pressure on the region during the pouring process in order to prevent the valve from returning to its closed position.

In other cases, the mechanism for allowing the beverage to be dispensed includes a shutter that is rotatable between two angular positions. At one angle, the shutter remains open, allowing the free passage of liquid, while at another angle, the shutter is closed, blocking the passage of liquid. However, a main inconvenience with such types of containers is that the position of the valve can accidentally be changed from, say, the open position to the closed position. If this accidental change of valve state occurs as the carafe falls during transportation, the liquid in the carafe will leak out through the open valve.

Clearly, there remains a need in the industry to provide a carafe that allows selective opening and closing of a valve, while remaining relatively simple to handle and designed so as to prevent the valve from accidentally opening.

SUMMARY OF THE INVENTION

The present invention recognizes that selective control of the state (e.g., open or closed) of a valve should be associated with movement of an actuator in a different direction than for securing the valve in the open position. If the combination of movements required to lock the valve in the open position can be made sufficiently complex to reduce its probability of opening unintentionally, the cap of the present invention will be rendered more likely to prevent accidental discharge than a cap that requires mere rotation or translation to maintain its passageway open. Meanwhile, the combination of movements should be simple enough to be performed by a single finger.

According a broad aspect, the invention seeks to provide a cap for a container adapted to carry a liquid. The cap includes a body having an inlet, a spout and a passageway between the inlet and the spout. The cap also includes a valve movable between a first position wherein the passageway is blocked and a second position wherein the passageway is at least partly unblocked, the valve being biased towards the first position. Furthermore, the cap includes an actuator mounted to the body and engaging the valve, wherein movement of the actuator causes the valve to move between the first and second positions, the actuator including a finger-actuated lock movable from an unlocked position into a locked position, the lock being capable of acquiring the locked position only when the actuator has caused the valve to occupy the second position, wherein when the lock is in the locked position, the valve is maintained in the second position.

According to another broad aspect, the present invention seeks to provide a container including a base adapted to carry a liquid and a cap detachably affixed to the base. The cap includes a body comprising an inlet in fluid communication with an interior of the base, a spout adapted to be in fluid communication with an exterior of the base and a passageway between the inlet and the spout. The cap further includes a valve movable between a first position wherein the passageway is blocked and a second position wherein the passageway is at least partly unblocked, the valve being biased towards the first position. In addition, the cap includes an actuator mounted to the body and engaging the valve, wherein actuation of the actuator causes the valve to move between the first and second positions, the actuator including a finger-actuated lock movable from an unlocked position into a locked position, the lock being capable of acquiring the locked position only when the actuator has caused the valve to occupy the second position, wherein when the lock is in the locked position, the valve is maintained in the second position.

According to yet another broad aspect, the present invention may be summarized as a cap for a container adapted to carry a liquid. The cap includes a body comprising an inlet, a spout and a passageway between the inlet and the spout. The body further includes a valve movable between a closed position wherein the passageway is blocked and an open position wherein the passageway is at least partly unblocked, the valve being biased towards the closed position. Also, the body includes an actuator mounted to the body and engaging the valve, the actuator being configured to lock the valve in the open position upon completion of a multi-directional movement.

The multi-directional movement includes movement of the actuator in a first direction whereby the valve is caused to move from the closed position to the open position, as well as movement of the actuator in a second direction after the actuator has moved at least partly in the first direction. The two movements need not occur sequentially. In fact, an embodiment of the invention provides that both movement of the actuator in the first direction and movement of the actuator in the second direction may occur at the same time, allowing gradual opening of the valve, which is eventually locked when fully opened.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1:
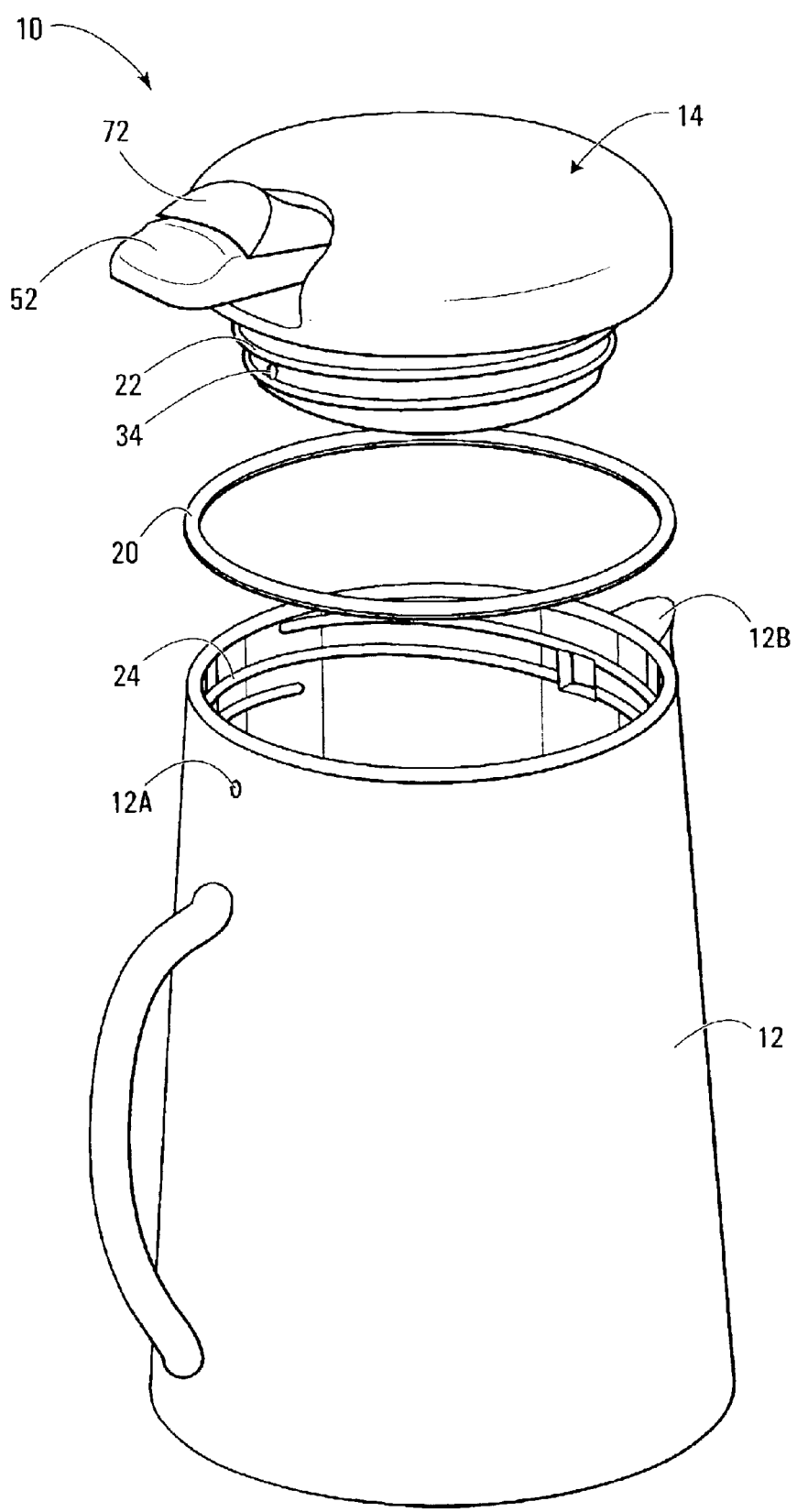
FIG. 1 is an exploded perspective view of a cap in accordance with an embodiment of the invention in relation to a container.
Figure 2:
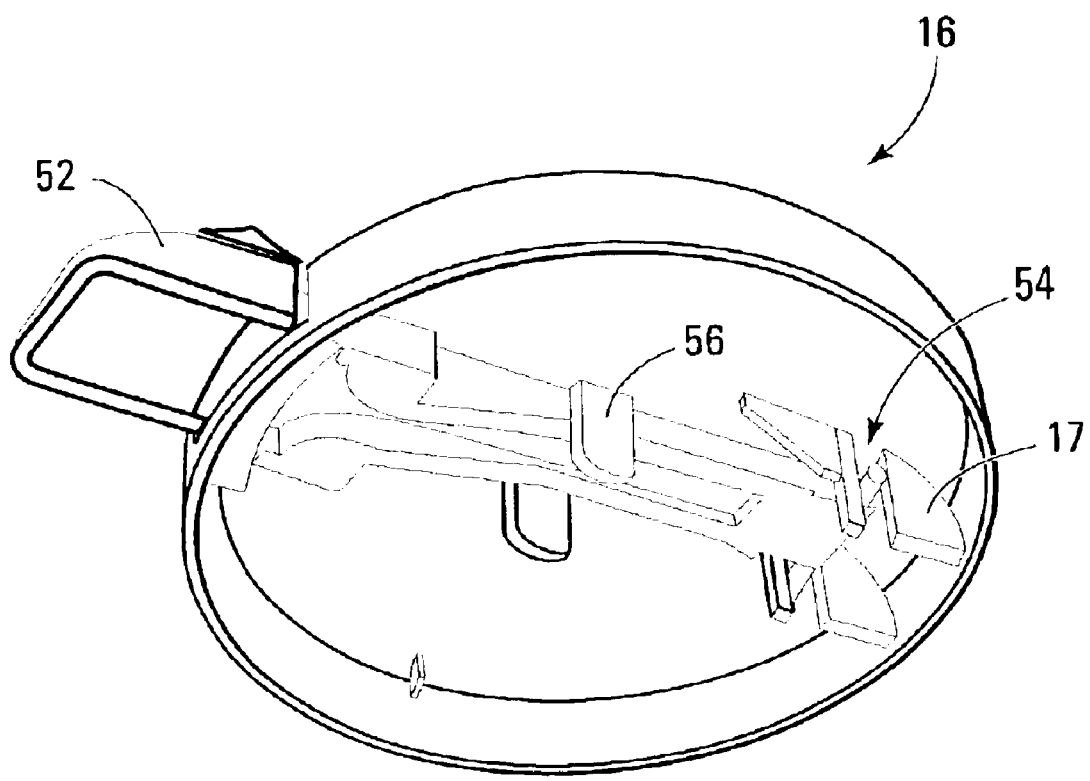
FIG. 2 is a perspective bottom view of a cover portion of the cap.

With reference to FIGS. 1 to 4B, there is shown a cap 10 for a container 12 adapted to carry a liquid such as coffee, water or juice, among others. The cap 10 includes a body 14 which may be formed from a cover portion 16 and a base portion 18 as shown particularly well in FIGS. 2, 4A and 4B. Each of the cover portion 16 and the base portion 18 includes components that will be described in greater detail later on. The cover portion 16 and the base portion 18 may be manufactured and assembled separately. The cover portion 16 and the base portion 18 include mating peripheral portions made of plastic which are resilient yet sufficiently flexible to allow complementary components 17, 19 on the cover portion and the base portion to mate in snap-in fashion. It may be advantageous to make the body 14, once assembled, impossible to separate into its constituent cover and base portions 16, 18 without breaking either one. In other embodiments, it may be advantageous to allow the complementary portions 16, 18 of the body 14 to be easily dissociated in order to permit their respective interior components to be cleaned.

The assembled cap 10, including the cover portion 16 and the base portion 18, is intended to be mounted to the container 12 by an end user. In the illustrated embodiment, the base portion 18 is equipped with a thread 22 which engages a complementary thread 24 on an inside wall of the container 12. This enables the cap 10 to be easily removed from the container 12, allowing the container to be emptied and cleaned and also allowing the cap 10 to be cleaned, or replaced when necessary or appropriate. Advantageously, the cap 10 can be reused over and over again with different containers or for dispensing different liquids at different times using the same container 12. In order to minimize leakage at the cap/container interface, a sealing ring 20 may be provided as shown in FIG. 1.

Figure 3:
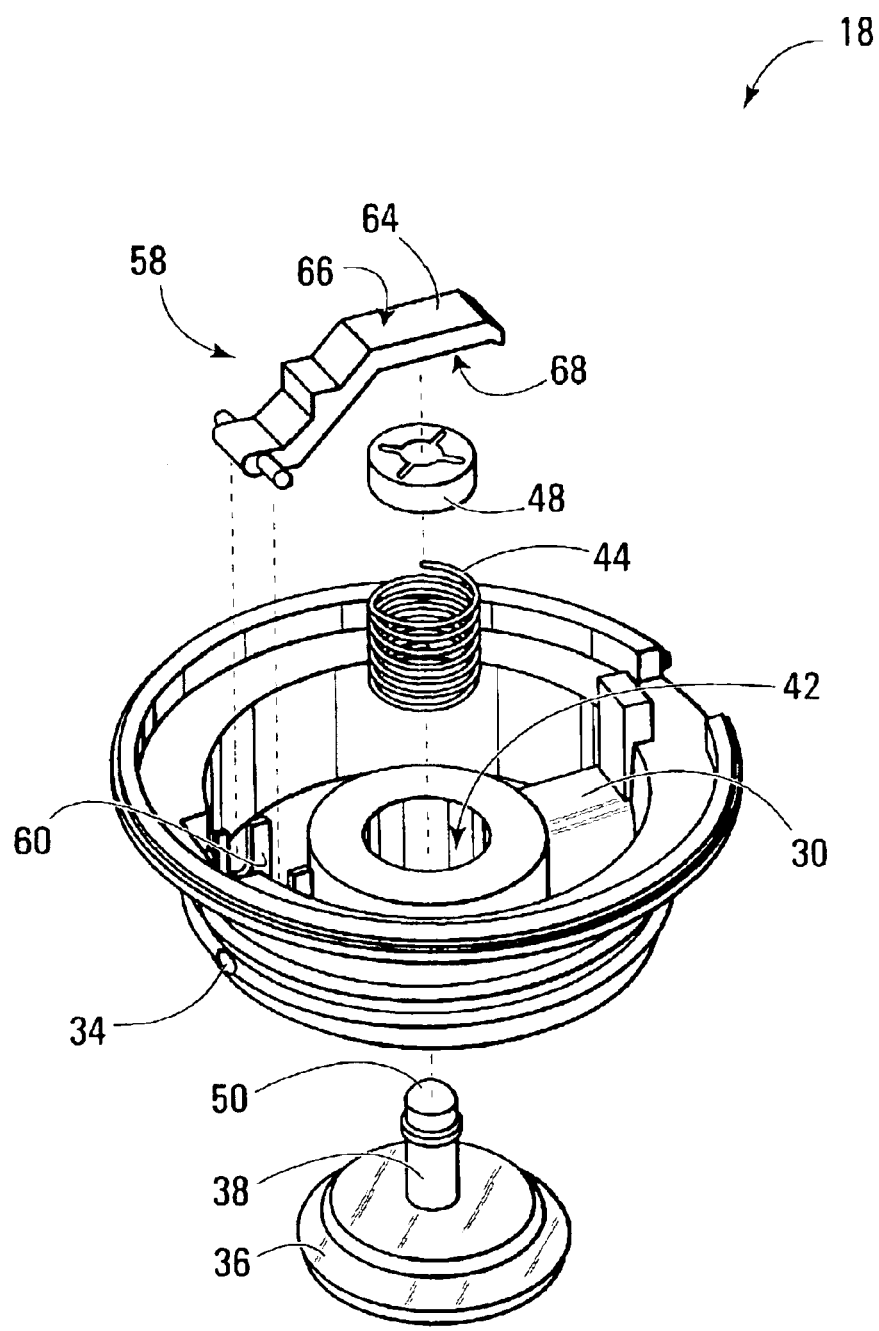
FIG. 3 is an exploded perspective view of the base portion of the cap, including a valve.
Figure 4A:
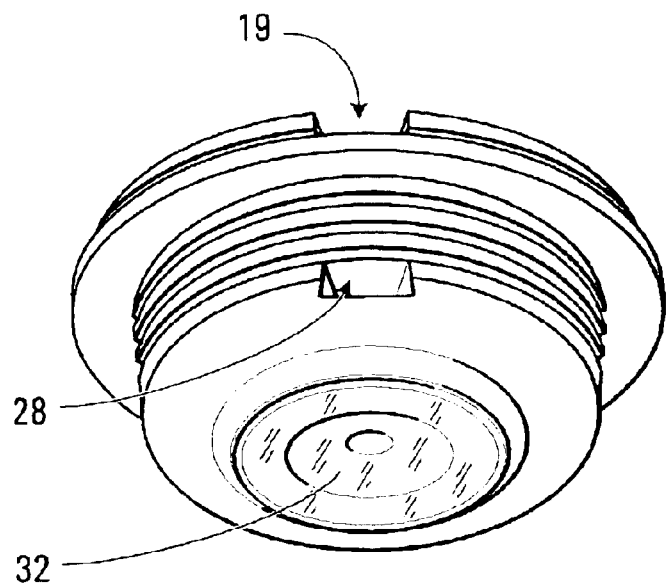
FIG. 4A is a perspective front view of the underside of the base portion of the cap.
Figure 4B:
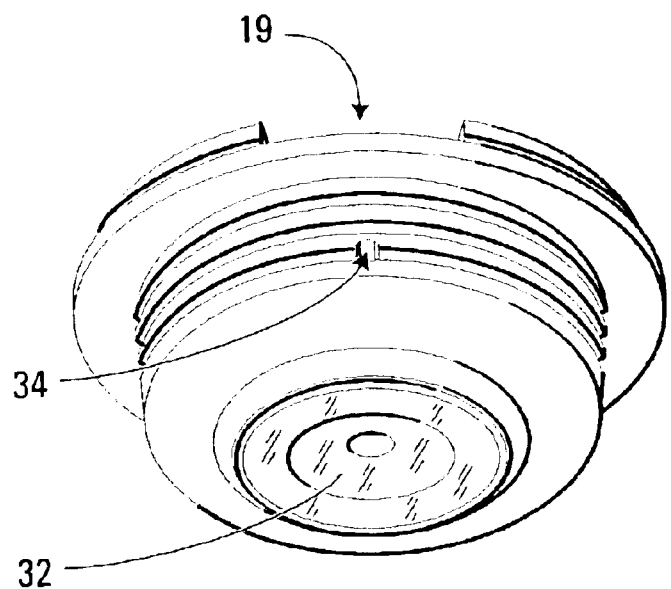
FIG. 4B is a perspective rear view of the underside of the base portion of the cap.
Figure 6:
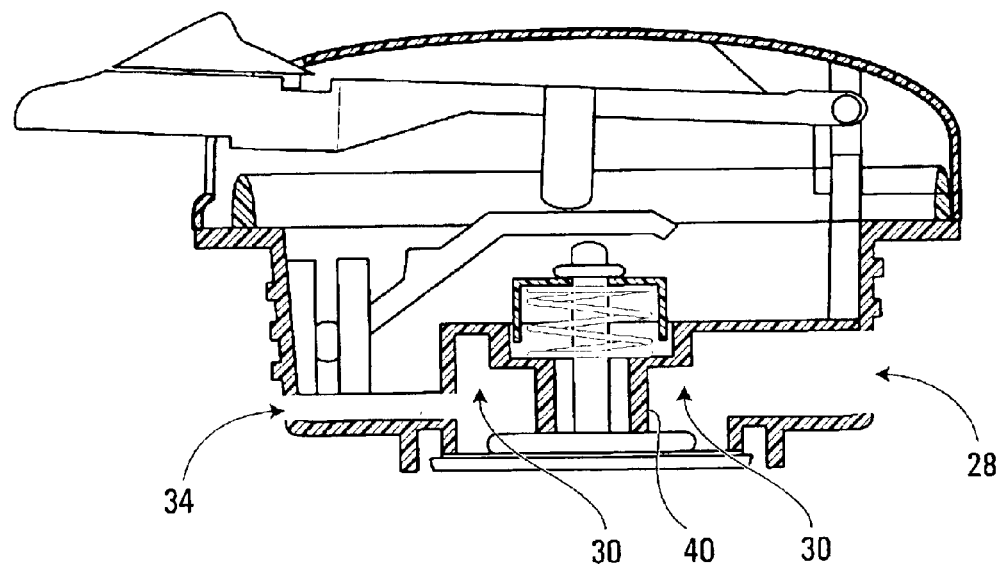
FIG. 6 is a sectional view of the cap when the valve is blocked.

In order to allow liquid inside the container 12 to be dispensed via the cap 10 into a vessel such as a cup or glass, the cap 10 includes an inlet 26, a spout 28 and a passageway between the inlet 26 and the spout 28. These components are best seen in FIGS. 3, 4 and 6. In the manner shown, the spout 28 is located at the height of the thread 22 located on the outside of the base portion 18. This presumes that the container 12 has a matching spout 12B that connects the thread 24 to the outside world. However, it will be appreciated that the spout 28 need not be located at the height of the thread 22 and may be located above or below the location illustrated, provided the container 12 has a suitably located spout 12B.

The cap 10 is also equipped with a valve 32 that is movable between a "closed" position in which the passageway 30 is blocked and an "open" position in which the passageway 30 is at least partly unblocked with respect to the passage of fluid. In the illustrated embodiment, the inlet 26 forms a region that is peripheral to the valve 32 such that the valve 32 either blocks or liberates the inlet 26. This has the advantage of preventing liquid in the container 12 from contaminating any portion of the passageway 30 until the moment has come when a user desires to actually dispense the liquid. However, it is within the scope of the present invention to reap other advantages arising from a design of the valve 32 such that it either blocks or liberates portions of the passageway 30 other than the inlet 26.

Also, in the illustrated embodiment, the entirety of the passageway 30 is contained within the base portion 18 of the cap 10. In other embodiments, a portion of the passageway 30 may in fact transit the cover portion 16 of the cap 10. It will be of advantage, in such an embodiment, to provide a leak-proof seal at those regions of the passageway 30 where the cover portion 16 and the base portion meet 18.

Because of the substantially air-tight conditions in the capped container 12 during dispensing of the liquid, there will result a decrease in air pressure which would disadvantageously cause a reduction in the rate at which the liquid can be dispensed. To prevent disadvantages associated with this scenario, a circuit is created between the interior of the passageway 30 and the exterior of the container 12. This can be achieved by providing an air intake that allows ambient air to replace the volume of liquid dispensed through the spout 28. In the illustrated embodiment, the air intake is provided in the form of a hole 34 that is drilled into a portion of the base portion 18 of the cap 10, in the vicinity of the thread 22. A corresponding passageway 12A leading to the outside world is assumed to be aligned with this hole 34 when the base portion 18 of the cap 10 is suitably screwed onto the container 12. Of course, it is understood that the air intake may take various other forms, such as a second passageway that leads from the passageway 30 to a hole in the cover portion 16 of the cap 10.

The construction of the valve 32, which is best illustrated in FIG. 3, is now described. Specifically, the valve 32 includes a valve head 36 connected to a valve stem 38. The valve head 36 is designed to seal the inlet 26 of the passageway 30 when the valve 32 is in the closed position. To this end, the base portion 18 of the cap 10 includes a valve seat 40 surrounding the inlet 26, which receives the valve head 36 when the valve 32 is in the closed position. The valve seat is not shown in FIG. 4A because the valve 32 is already in the closed position; however, FIG. 6 shows the valve seat 40 as being the locus for the valve head 36 when the valve 32 is in the closed position. Also, it will be understood that there may be of advantage to providing a sealing ring 46 between the valve head 36 and the inlet 26. This may be achieved in many ways known to the person of ordinary skill in the art, e.g., by adhesively attaching the sealing ring 46 to the valve head 36 or to the inlet 26.

The valve stem 38 is mounted within a hollow guide section 42 created in the base portion 18 of the cap 10. Axial movement of the valve head 36 and valve stem 38 combination is permitted within the hollow guide section 42. A biasing mechanism is provided to bias the valve 32 in the closed position, i.e., for biasing the valve head 36 against the valve seat 40 (with the sealing ring 46 disposed therebetween). In the illustrated embodiment, the biasing mechanism is a helical spring 44 which is disposed within the hollow guide section 42, wrapped about the valve stem

38. More specifically, an interior of the hollow guide section 42 includes a spring seat (not shown) which accommodates one extremity of the spring 44. The other extremity of the spring 44 engages a clip 48 near an extremity 50 of the valve stem 38. (The clip 48 can be retained by a groove near the extremity 50 of the valve stem 38.) Thus, the spring 44 is more compressed when the valve 32 is in the open position (i.e., when the clip 48 is pushed downwards in the orientation of the drawings) than when the valve 32 is in the closed position, hence demonstrating the biasing functionality of the spring 44.

Because the spring 44 will typically be made of metal and the spring seat, being part of the base portion 18 of the cap 10, is typically made of plastic, excessive opening and closing of the valve 32 may result in the plastic becoming worn out and eventually failing in a critical manner. To increase the useful life of the cap 10, therefore, it may be advantageous to provide a plastic or, even more advantageously, a metallic washer (not shown) in the spring seat. The usage of such a washer will prevent the majority of the friction associated with the scratching motion of the spring 44 to be transferred over to the spring seat.

In order to cause the valve 32 to move from the open to the closed position and vice versa, there is provided an arrangement of cooperating levers, including a first lever 52 that is accessible at the exterior of the cap 10. Advantageously, the first lever 52 is finger actuated, meaning that a single human finger is capable of depressing the first lever 52 so as to actuate the valve 32. In the embodiment best seen in FIG. 2, the first lever 52 is pivotally mounted to the cover portion 16 of the cap 10. Specifically, a first hinge 54 is provided that is diametrically opposite the area where it is intended that a finger will depress the first lever 52. Thus, depressing of the first lever 52 will cause it to pivot about the first hinge 54, resulting in a protruding portion 56 of the first lever 52 to proceed in a generally downwards direction, although at a slight curvature, depending on the distance between the first hinge 54 and the center of the cover portion 16, which is in this case circular.

Disposed between the first lever 52 and the extremity 50 of the valve stem 38 containing the clip 48 is a second lever 58. The second lever 58 is pivotally mounted to the base portion 18 of the cap 10 at a second hinge 60 that is located opposite the first hinge 54 corresponding to the first lever 52. In other words, the second hinge 60 is located on the same side of the cap 10 as the portion of the first lever 52 that is actuated by a human finger. However, the second hinge 60 is positioned such as to reduce the arc length through which the second lever 58 travels when it is subjected to action of the first lever 52. The second lever 58 is therefore suitably in the shape of an angled arm, which has a substantially flat distal portion 62 in the area of the valve stem 38 and a proximal portion 64 that joins the distal portion 62 to the second hinge 60.

In this way, the second lever 58 provides an interface between the protruding portion 56 of the first lever 52 and the extremity 50 of the valve stem 38. Specifically, generally downward motion of the protruding portion 56 of the first lever 52 (caused by pivotal motion of the first lever 52) causes pivotal motion of the proximal portion 64 of the second lever 58, which translates into substantially downward motion of the distal portion 62 of the second lever 58, although with a residual arc component to this motion. This, in turn, results in motion of the valve stem 38 within the hollow guide section 42.

In order to prevent undue stress or even breakage of components, the design of the cap 10 should take into consideration the need to translate arc motion into downward motion of the valve stem 38. Thus, the distal portion 62 of the arm-shaped second lever 58 is substantially flat on either surface thereof. Smoothness of the upper surface 66 allows the protruding portion 56 of the first lever 52 to glide therealong when transferring the arc component of its motion to the second lever 58. In addition, smoothness of the lower surface 68 allows the extremity 50 of the valve stem 38 to glide therealong while the second lever 58 exerts slightly arc-like motion in a generally downward direction.

Thus, the arrangement of levers 52, 58 allows the valve 32 to move from the open position to the closed position, while the spring 44 continually attempts to push the valve 32 back into the closed position. In order to allow the valve 32 to remain in the open position and aid in the dispensing of liquid easily and without the use of two hands, the cap 10 of the present invention includes a finger-actuated locking mechanism. In the illustrated embodiment, the locking mechanism is located within finger's reach of the portion of the first lever 52 that is depressed in order to open the valve 32.

As shown generally in FIG. 1, the locking mechanism is in the form of a tab 72 that is slidably mounted to the first lever 52. More specifically, the tab 72 can be wedged between the first lever 52 and the cover portion 16 of the cap 10 in order to lock the valve 32 in the open position. In other words, when the arrangement of levers 52, 58 has caused the valve 32 to open, movement of the tab 72 in a direction towards the first hinge 54 corresponding to the first lever 52 wedges the tab 72 between the first lever 52 and the cover portion 16 of the cap 10. This will be described in greater detail later on with respect to FIGS. 5, 6, 8 and 10.

Figure 5:
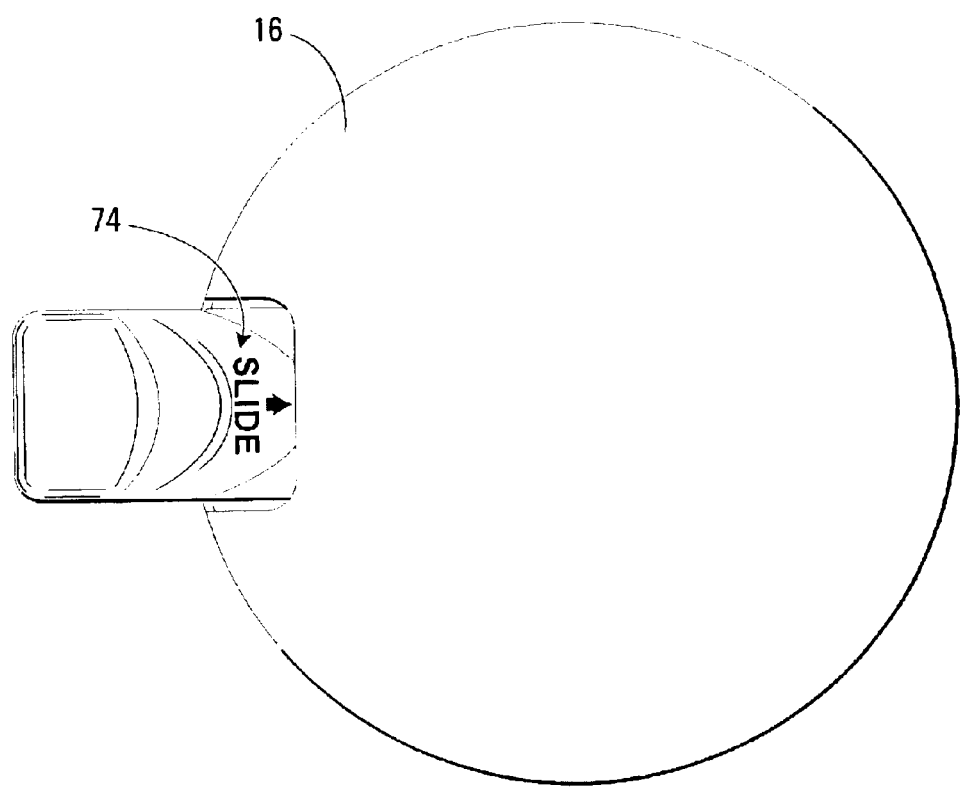
FIG. 5 is a plan view of the cap when the valve is blocked.
Figure 7:
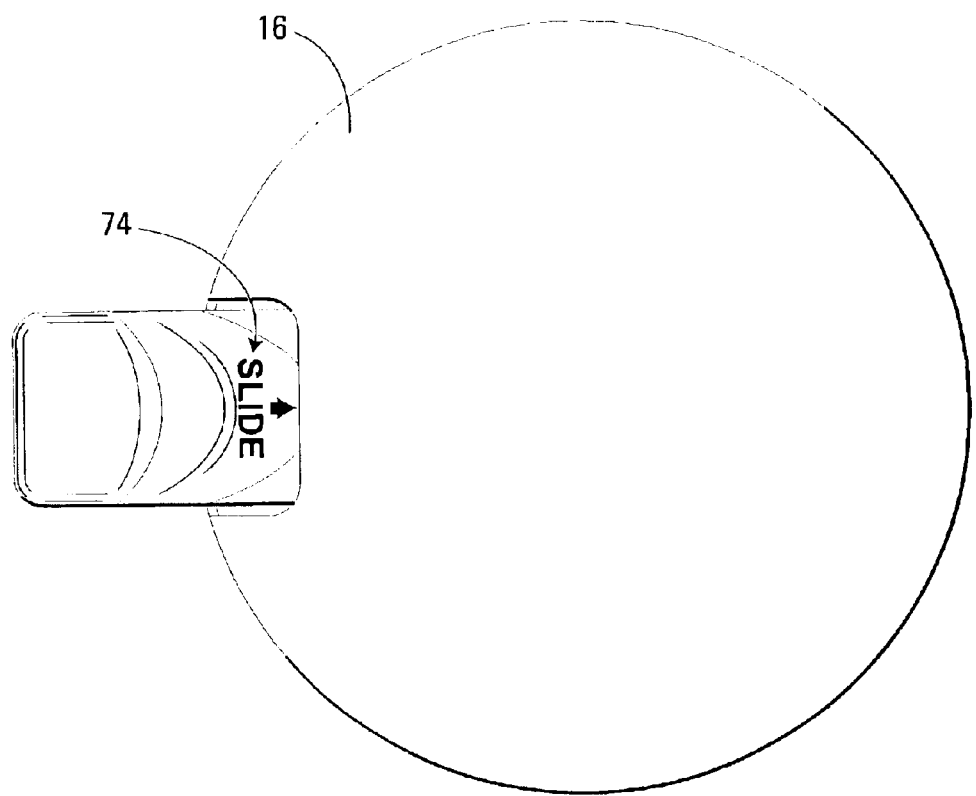
FIG. 7 is a plan view of the cap when the valve is open but not locked.
Figure 9:
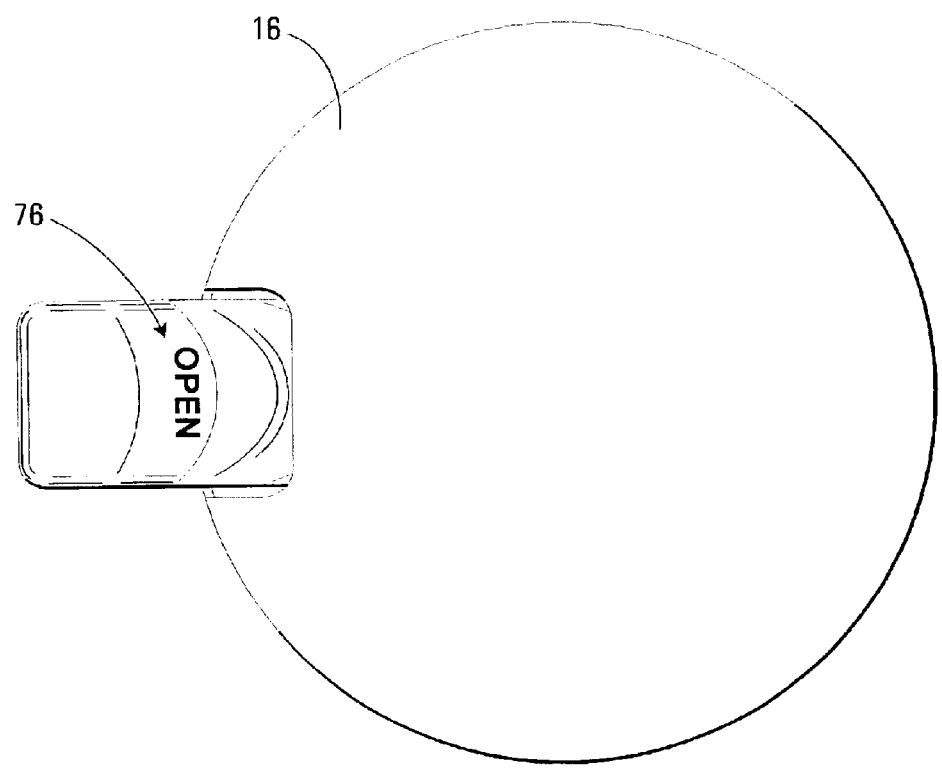
FIG. 9 is a plan view of the cap when the valve is locked open.

FIGS. 5, 7 and 9 also show an indicator 74 which visually conveys to a user that the locking mechanism has not been applied (i.e., the tab 72 has not yet been slid forward along the first lever 52) to keep the valve 32 in the open position. Specifically, the indicator 74 conveys a first information component, indicative of an inability of the liquid to pass through the passageway 30 or of a direction in which to displace the tab 72 in order to lock it. For example, use of either the imperative "SLIDE" or the expression "PRESS TO LOCK" conveys an action required to be performed and hence is indicative that the cap 10 is not yet in use, which gives the intuitive impression that the valve 32 is closed. However, the use of these particular expressions should not be perceived as a limitation of the present invention, since any other suitable word, symbol, picture, mnemonic or texture (e.g., Braille) may be used.

In accordance with the present embodiment, the indicator 74 is visible only when the locking mechanism has not been applied. Once the locking mechanism has been applied, as shown in FIG. 9, the indicator 74 disappears. This can be implemented by printing the indicator 74 on a portion of the upper surface of the tab 72, which corresponds to a portion of the tab 72 that is hidden underneath the cover portion 16 of the cap 10 when the tab 72 is slid thereunder. Also, once the tab 72 has been wedged in this manner in order to lock the valve 32 in the open position, a second indicator 76, previously concealed, is revealed.

Specifically, the second indicator 76 conveys a second information component, indicative of an ability to dispense liquid and/or that the valve 32 is locked in the open position. A word such as "OPEN" or "LOCKED" is convenient for this purpose, although the use of this particular word should not be perceived as a limitation of the present invention, since any other suitable word, symbol, picture, mnemonic or texture may be used. In order to allow the second indicator 76 to be concealed prior to sliding of the tab 72 and to be revealed thereafter, it is convenient to print the second indicator 76 on a portion of the upper surface of the first lever 52 which is revealed only when the tab 72 is slid underneath the cover portion 16 of the cap 10. The second indicator 76 may also convey information regarding a direction in which to displace the tab 72 in order to unlock the valve 32 from the open position. This may be achieved by means of an arrow, for example, although any suitable word, symbol, picture, mnemonic or texture may be used for this purpose.

It will be understood that the second indicator 76 may not immediately be visible upon having wedged the tab 72 under the cover portion 16 of the cap 10. This is because the finger which has actuated the tab 72 is likely to be covering the second indicator 76. However, upon removal of the finger, e.g., during the natural position assumed during pouring of the beverage and also when setting down the container 12 for use by others, the second indicator will be clearly visible, thus being able to convey the second information component. This has the advantage of serving as a warning to others that the passageway 30 is open and that, in the case of a hot beverage, for example, scalding may occur if the container 12 is tilted.

Figure 8:
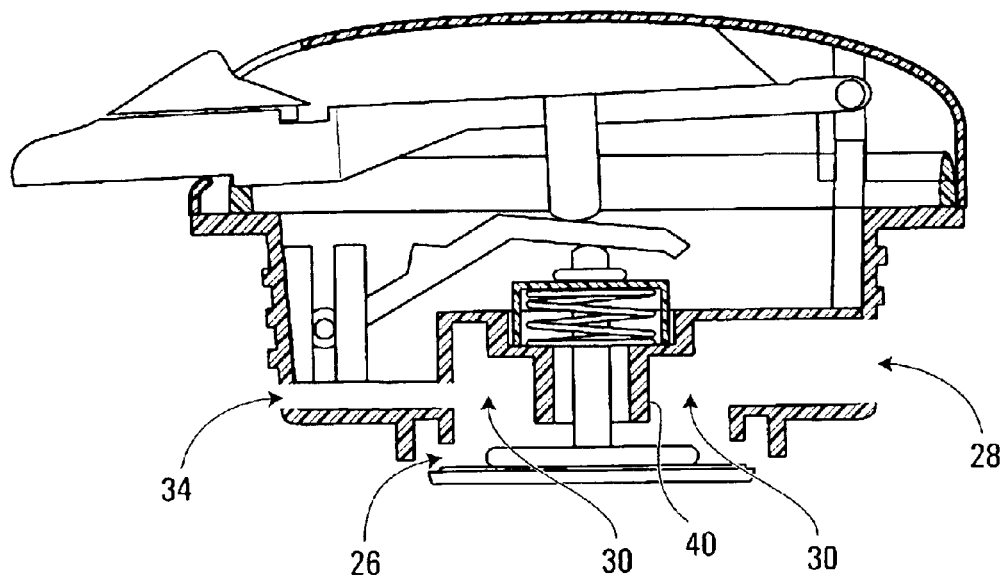
FIG. 8 is a sectional view of the cap when the valve is open but not locked.
Figure 10:
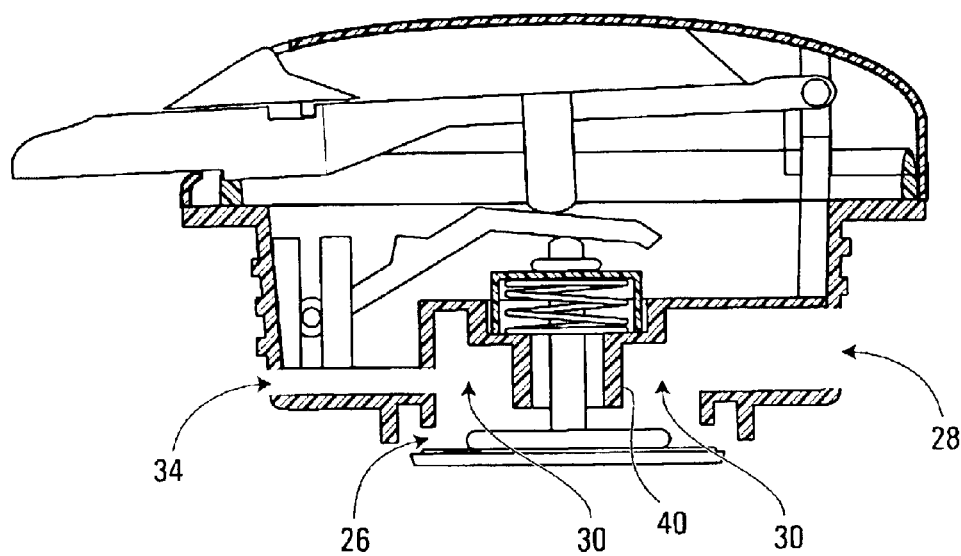
FIG. 10 is a sectional view of the cap when the valve is locked and open.

The three main positions of the various components of the cap 10 when the valve is closed, "open but not locked", and "open and locked" are now described in greater detail with respect to FIGS. 6, 8 and 10, respectively. By way of reminder, a plan view of the cover portion 16, from the perspective of a user, is shown in FIGS. 5, 7 and 9, respectively.

FIG. 5 illustrates a plan view of the cap 10 in the case where the valve 32 is in the closed position, whereby the spring 44 is extended to its maximum within the allowed range, causing the valve head 36 to rest on the valve seat 40. Contact may or may not exist between the lower surface of the first lever 52 and the upper surface 66 of the distal portion 62 of the second lever 58, as well as between the lower surface 68 of the distal portion 62 of the second lever, 58 and the extremity 50 of the valve stem 38. It is noted that the tab 72 cannot be slid along the first lever 52 without the first lever 52 having begun its downwards progression under the exertion of pressure by a finger.

FIG. 7 illustrates a plan view of the cap 10 in the case where the valve 32 is in the "open but not locked" position, whereby the first lever 52 has been forced downwards. This has caused the valve head 36 to disengage from the valve seat 40 against the natural tendency of the spring 44, thus freeing the inlet 26 of the passageway 30. The valve stem 38 has traveled in a substantially axial direction through the hollow guide section 42. It is noted that the protruding portion 56 of the first lever 52 has undergone slight sliding motion vis-a-vis the upper surface 66 of the distal portion 62 of the second lever 58 and that the lower surface 68 of the distal portion 62 of the second lever 58 has slid slightly with respect to the extremity 50 of the valve stem 38. It is noted that even if sliding is slightly inhibited, this will not critically affect opening of the valve 32, as the relationship between the thickness of the valve stem 38 and the width of the hollow guide section 42 permits some "play", allowing the valve stem 38 to slightly skew as it travels therethrough. That is to say, the motion of the valve stem 38 need only be generally axial and need not be perfectly axial.

FIG. 9 illustrates a plan view of the cap 10 in the case where the valve 32 is in the "open and locked" position, whereby pressure from the finger has caused the tab 72 to slide along the upper surface of the first lever 52 and to wedge itself between the upper surface of the first lever 52 and the cover portion 16 of the cap 10. At this point, all external pressure can be removed from the first lever 52 and the valve 32 will be retained in the open position. The biasing of the valve 32 in the closed position, as was the case prior to application of the locking mechanism, has now been superseded by biasing it in the open position through wedging of the tab 72. Unless the tab 72 is slid back along the upper surface of the first lever 52, the valve 32 will remain in the open position.

In the embodiment described above, the tab 72 remains wedged under the cover portion 16 of the cap 10 through frictional forces. This requires that the spring 44, while required to be sufficiently strong to bias the valve 32 in the closed position when the locking mechanism has been released, should not be so strong as to push the tab 72 out from under the cover portion 16 of the cap 10. Of course, the selection of spring 44 whose spring constant obeys these basic principles is well within the means of a person of ordinary skill in the art. Moreover, other ways of ensuring that the locking mechanism does not spontaneously disengage will be understood to those of ordinary skill in the art. These include providing various types of detent mechanisms and latches for the tab 72, all advantageously capable of finger actuation. Of course, it is also within the scope of the present invention to use biasing mechanisms other than a helical spring 44 in order to maintain the valve 32 in the closed position. These include leaf springs, gravity-based mechanisms and other devices known to those of ordinary skill in the art.

Furthermore, it is noted that the progression from the scenario of FIG. 5 to the scenario of FIG. 9 may occur gradually rather than by first fully opening the valve 32 and then proceeding to apply the locking mechanism. In other words, gradual motion of the first lever 52 with respect to the cover portion 16 of the cap 10 may occur contemporaneously with gradual motion of the tab 72 with respect to the first lever 52, until both the valve 32 is open and the tab 72 locks the first lever 52 against returning to its original position.

It will thus be appreciated that completion of a multi-directional movement will end up locking the valve 32 in the open position. The multi-directional movement involves movement of a lever arrangement in a first direction (e.g., downwards), causing the valve 32 to move from the closed position to the open position and movement of the lever arrangement in a second direction (e.g., along the upper surface of the first lever) after the first lever 52 has moved at least partly in the first direction.

The above demonstrates that when a user desires to maintain the passageway 30 free, the cap 10 of the present invention can be locked with a single finger, hence eliminating the requirement for high dexterity when pouring liquid from a conventional beverage container having a spring-loaded valve. Meanwhile, the combination of movements required to lock the valve 32 in the open position is sufficiently complex to reduce its probability,of occurring unintentionally, thereby rendering the cap of the present invention is more likely to prevent accidental discharge than a cap that requires mere rotation or translation to maintain its passageway open.

It will also be appreciated by those of ordinary skill in the art that the lever arrangement described herein above may be replaced by myriad variations, in some cases having a single lever and in other cases not having any levers at all. For instance, the same advantages can be reached if a push-button actuator is used. Such an arrangement does not require pivotal motion of any its components. Still, a biasing mechanism would allow the valve 32 to be opened upon pressing the push-button, while application of a sliding motion to the depressed push-button would cause the push-button to become wedged between immobilized pieces of the cap 10, hence locking the valve 32 in the open position. Many other variations can be implemented by those of ordinary skill in the art without departing from the spirit of the present invention.

While specific embodiments of the present invention have been described and illustrated, it will be apparent to those skilled in the art that numerous modifications and variations can be made without departing from the scope of the invention as defined in the appended claims.

What is claimed is:

1. A cap for a container adapted to carry a liquid, comprising:
   (a) a body comprising a hollow guide section, an inlet, a valve seat surrounding said inlet, a spout and a passageway between said inlet and said spout;
   (b) a valve movable between a first position wherein said passageway is blocked and a second position wherein said passageway is at least partly unblocked, said valve being biased towards said first position and comprising a valve head connected to a valve stem, said valve stem being mounted in said hollow guide section, said valve head being received in said valve seat when said valve is in said first position;
   (c) a first actuator pivotally mounted to said body, wherein movement of said actuator is a pivotal movement that causes said valve to move between said first and second positions, said actuator comprising a finger-actuated lock movable from an unlocked position into a locked position, said lock being capable of acquiring said locked position only when said actuator has caused said valve to occupy said second position, wherein when said lock is in said locked position, said valve is maintained in said second position; and
   (d) a second actuator pivotally mounted to said body and disposed between said first actuator and said valve, said second actuator being configured to convert the pivotal movement of said first actuator into movement of said valve stem along said hollow guide section, said second actuator comprising a substantially planar top portion in slidable contact with a contact point of said first actuator, for allowing said contact point of said first actuator to slide along said top portion as the pivotal movement of said first actuator is transferred into pivotal movement of said second actuator, said second actuator having a substantially planar bottom portion opposite said top portion and in slidable contact with an extremity of said valve stem, for allowing said extremity of said valve stem to slide along said bottom portion as the pivotal movement of said second actuator is transferred into movement of said valve stem along said hollow guide section.

2. A cap as defined in claim 1, wherein said passageway is a first passageway and said body comprises a third opening and a second passageway, said second passageway being defined between said third opening and said first passageway, said third opening defining an air intake.

3. A cap as defined in claim 2, wherein said valve comprises means for biasing said valve head against said valve seat.

4. A cap as defined in claim 3, wherein said means for biasing is a spring.

5. A cap as defined in claim 4, wherein said spring is compressed when said valve is in said second position.

6. A cap as defined in claim 5, wherein said body further comprises a spring seat surrounding said hollow guide section, said spring having a first end, a second end and a helix extending therebetween, said helix being mounted around said hollow guide section, said first end of said spring being attached to said valve stem, said second end of said spring being mounted in said spring seat.

7. A cap as defined in claim 6, wherein said spring comprises a clip affixed to said first end of said spring, said valve stem having a groove for retaining said clip.

8. A cap as defined in claim 1, wherein said body comprises a top portion matingly engaged with a bottom portion and said lock comprises a portion that is wedged between said first actuator and said top portion when said lock is moved into said locked position.

9. A cap as defined in claim 1, wherein said lock comprises an indicator visually indicative of whether said lock is in said locked position or in said unlocked position.

10. A cap as defined in claim 9, wherein said indicator visually conveys a first information component when said lock is in said unlocked position.

11. A clip as defined in claim 10, wherein said first information component is concealed by said body when said lock is in said locked position.

12. A cap as defined in claim 10, wherein said first information component is indicative of an inability of said liquid to pass through said passageway.

13. A cap as defined in claim 11, wherein said first information component is indicative of a direction in which to displace said lock towards said locked position.

14. A cap as defined in claim 13, wherein said first information component comprises an arrow or the word SLIDE.

15. A cap as defined in claim 10, wherein said indicator visually conveys a second information component when said lock is in said locked position.

16. A cap as defined in claim 15, wherein said second information component is concealed when said lock is in said unlocked position.

17. A cap as defined in claim 16, wherein said second information component is indicative of an ability of the liquid to pass through said passageway when said lock is in said locked position.

18. A cap as defined in claim 16, wherein said second information component comprises the word OPEN or LOCKED.

19. A cap as defined in claim 1, wherein said body is configured for detachable engagement with the container.

20. A cap as defined in claim 19, wherein said body comprises a threaded cylindrical portion for engaging with a correspondingly threaded cylindrical portion of the container.

21. A cap as defined in claim 20, wherein said body further comprises a sealing ring for sealable engagement with the container.

22. A cap for a container adapted to carry a liquid, comprising:
   (a) a body comprising an inlet, a spout and a passageway between said inlet and said spout;
   (b) a valve movable between a first position wherein said passageway is blocked and a second position wherein said passageway is at least partly unblocked, said valve being biased towards said first position; and (c) an actuator mounted to said body and engaging said valve, wherein movement of said actuator causes said valve to move between said first and second positions, said actuator comprising a finger-actuated lock movable from an unlocked position into a locked position, said lock being capable of acquiring said locked position only when said actuator has caused said valve to occupy said second position, wherein when said lock is in said locked position, said valve is maintained in said second position, said lock comprising a first indicator visually conveying a first information component when said lock is in said unlocked position and said actuator comprising a second indicator visually conveying a second information component when said lock is in said locked position, said second information being concealed by said lock when said lock is in said unlocked position.

23. A cap as defined in claim 22, wherein said first information is indicative of an inability of the liquid to pass through said passageway.

24. A cap as defined in claim 22, wherein said first information component is indicative of a direction in which to displace said lock towards said locked position.

25. A cap as defined in claim 24, wherein said first information component comprises an arrow or the word SLIDE.

26. A cap as defined in claim 22, wherein said first information component is concealed by said cap body when said lock is in said locked position.

27. A cap as defined in claim 22, wherein said second information component is indicative of an ability of the liquid to pass through said passageway when said lock is in said locked position.

28. A cap as defined in claim 27, wherein said second information component comprises the word OPEN or LOCKED.

29. A cap as defined in claim 22, wherein said body is configured for detachable engagement with the container.

30. A cap as defined in claim 29, wherein said body comprises a threaded cylindrical portion for engaging with a correspondingly threaded cylindrical portion of the container.

31. A cap as defined in claim 30, wherein said body further comprises a sealing ring for sealable engagement with the container.

32. A cap as defined in claim 22, wherein said body comprises a hollow guide section and a valve seat surrounding said inlet and said valve comprises a valve head connected to a valve stem, said valve stem being mounted in said hollow guide section and said valve head being received in said valve seat when said valve is in said first position.

33. A cap as defined in claim 32, wherein said actuator is a first actuator and said cap comprises a second actuator pivotally mounted to said body and disposed between said first actuator and said valve, said second actuator being configured to convert the pivotal movement of said first actuator into movement of said valve stem along said hollow guide section, said second actuator comprising a substantially planar top portion in slidable contact with a contact point of said first actuator, for allowing said contact point of said first actuator to slide along said top portion as the pivotal movement of said first actuator is transferred into pivotal movement of said second actuator, said second actuator having a substantially planar bottom portion opposite said top portion and in slidable contact with an extremity of said valve stem, for allowing said extremity of said valve stem to slide along said bottom portion as the pivotal movement of said second actuator is transferred into movement of said valve stem along said hollow guide section.

34. A cap as defined in claim 22, wherein said passageway is a first passageway and said body comprises a third opening and a second passageway, said second passageway being defined between said third opening and said first passageway, said third opening defining an air intake.

35. A cap as defined in claim 34, wherein said valve comprises means for biasing said valve head against said valve seat.

36. A cap as defined in claim 35, wherein said means for biasing is a spring.

37. A cap as defined in claim 36, wherein said spring is compressed when said valve is in said second position.

* * * * *